Patented July 6, 1943

2,323,309

UNITED STATES PATENT OFFICE 2,323,309

MEDICINAL AGENT

Walter G. Christiansen, Glen Ridge, N. J., and Alfred E. Jurist, Brooklyn, N. Y., assignors to E. R. Squibb & Sons, New York, N. Y., a corporation of New York No Drawing. Application July 20, 1940,
Serial No. 346,660

5 Claims. (Cl. 167—69)

This invention relates to, and has for its object the provision of, improved medicinal agents for syphilis and other spirochetal and trypanosomal diseases.

A therapeutically-useful condensation-product has heretofore been obtained by treating 4-arsinoso-2-amino-phenol with more than two molecular equivalents of sodium formaldehyde sulfoxylate.

It has now been found that improved medicinal agents of this type may be obtained by treating 4-arsinoso-2-amino-phenol with such proportion of sodium formaldehyde sulfoxylate (less than two molecular equivalents) that the product is water-soluble and contains some 4-arsinoso-2-amino-phenol as such. The condensation may be effected by merely bringing the reactants together in a suitable medium, preferably under anoxygenic conditions (either in vacuo or under an inert atmosphere, such as nitrogen), to protect both the arsinoso group and the methylene sulfoxylate side-chain against the deleterious effect of atmospheric oxygen. It is desirable also—in order to minimize reduction of the arsinoso compound—that the condensation be effected at a temperature no higher, and preferably lower, than room temperature.

To compensate for any variations in the products as to arsenic content and pH, for example, and to assure the obviously desirable constancy in these and other characteristics, the products may be blended with suitable inert substances.

Manifestly, the medicinal agents of this invention may also be obtained by incorporating 4-arsinoso-2-amino-phenol in other condensation products of 4-arsinoso-2-amino phenol and sodium formaldehyde sulfoxylate.

The following examples are illustrative of the invention:

Example 1

114 g. 4-arsinoso-2-amino-phenol hydrochloride hemialcoholate is dissolved in 445 cc. deoxygenated water, and a solution of 98.5 g. (1.5 molecular equivalents) crystalline sodium formaldehyde sulfoxylate is added. In a few minutes there is formed a yellow precipitate, which is redissolved by adding a solution of 45 g. sodium carbonate monohydrate in 150 cc. water, the resulting solution being alkaline to phenolphthalein. The solution is neutralized by introduction of carbon dioxide until phenolphthalein is no longer turned red, and is then filtered clear and poured with stirring into 9130 cc. cold absolute alcohol. The pale-yellow solid precipitated is collected on a Buchner funnel, washed with 1000 cc. cold absolute alcohol, and dried in vacuo over phosphoric anhydride. It contains some 4-arsinoso-2-amino-phenol as such, and is readily water-soluble, yielding a clear, pale-yellow-colored solution.

Example 2

12 g. 4-arsinoso-2-amino-phenol hydrochloride hemialcoholate is dissolved in 25 cc. deoxygenated water at a temperature below 5° C., and 8.75 g. (1.2 molecular equivalents) crystalline sodium formaldehyde sulfoxylate dissolved in 15 cc. water at a temperature below 5° C., is added. The precipitate which forms in a short time is redissolved by adding 5 cc. cold water (below 5° C.) and 4.2 gm. solid sodium carbonate monohydrate. The solution—which is now alkaline to phenolphthalein—is then neutralized by introducing carbon dioxide gas. (The operations are carried out with the reaction mixture immersed in an ice-water bath to maintain the temperature below 5° C. at all times.) The neutralized solution is filtered clear, and poured with stirring into 600 cc. cold absolute alcohol. The pale-yellow precipitate formed is collected on a Buchner funnel, washed with cold absolute alcohol, and dried in vacuo over phosphoric anhydride. The product usually contains more 4-arsinoso-2-amino-phenol as such than that obtained by Example 1, and is readily water soluble, yielding a clear, pale-yellow-colored solution.

Example 3

12.9 g. 4-arsinoso-2-amino-phenol hydrochloride hemi-alcoholate is dissolved in 51 cc. deoxygenated water, and a solution of 5.9 g. (0.77 molecular equivalent) crystalline sodium formaldehyde sulfoxylate in 8 cc. deoxygenated water is added. The yellow precipitate formed is redissolved by adding 3.5 g. sodium carbonate monohydrate, and the solution is filtered clear and poured slowly with stirring into 600 cc. cold absolute alcohol. The resulting yellow precipitate is collected on a Buchner funnel, washed with 300 cc. absolute alcohol, and dried in vacuo over phosphoric anhydride. (The entire process is carried out under anoxygenic conditions.) The product is readily water-soluble, and contains some 4-arsinoso-2-amino-phenol as such.

If in the foregoing examples the proportions used were 1 mole of 4-arsinoso-2-amino-phenol hydrochloride hemialcoholate to 2 moles of crystalline sodium formaldehyde sulfoxylate, the product would contain no 4-arsinoso-2-aminophenol as such.

The invention may be variously otherwise embodied, within the scope of the appended claims.

We claim:

1. A water-soluble medicinal agent essentially comprising a product formed by the condensation of 4-arsinoso-2-amino-phenol with sodium formaldehyde sulfoxylate at no higher than room temperature, and some 4-arsinoso-2-amino-phenol as such.

2. A medicinal agent substantially identical with that obtained by treating 4-arsinoso-2-amino-phenol at no higher than room temperature with such proportion of sodium formaldehyde sulfoxylate that the product is water-soluble and contains some 4-arsinoso-2-amino-phenol as such.

3. A medicinal agent essentially comprising a product substantially identical with that obtained by treating 4-arsinoso-2-amino-phenol with about 1.5 molecular equivalents of sodium formaldehyde sulfoxylate at no higher than room temperature.

4. A medicinal agent essentially comprising a product substantially identical with that obtained by treating 4-arsinoso-2-amino-phenol with about 1.2 molecular equivalents of sodium formaldehyde sulfoxylate at no higher than room temperature.

5. A medicinal agent essentially comprising a product substantially identical with that obtained by treating 4-arsinoso-2-amino-phenol with about 0.75 molecular equivalent of sodium formaldehyde sulfoxylate at no higher than room temperature.

WALTER G. CHRISTIANSEN.
ALFRED E. JURIST.